(12) United States Patent  (10) Patent No.: US 8,007,227 B2
Rogall et al.  (45) Date of Patent: Aug. 30, 2011

(54) MECHANICAL EMERGENCY BRAKE FOR WIND TURBINES AND METHOD FOR OPERATING SAME

(75) Inventors: Peter Rogall, Emsbueren (DE); Patrick Achenbach, Rheine (DE)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 11/572,775

(22) PCT Filed: Jul. 28, 2004

(86) PCT No.: PCT/EP2004/008444
§ 371 (c)(1), (2), (4) Date: Jan. 26, 2007

(87) PCT Pub. No.: WO2006/010377
PCT Pub. Date: Feb. 2, 2006

(65) Prior Publication Data
US 2007/0189900 A1    Aug. 16, 2007

(51) Int. Cl.
*F03D 11/02*    (2006.01)
(52) U.S. Cl. .......................................... 415/123; 416/26
(58) Field of Classification Search ................. 415/123; 416/26, 27, 35, 43, 47, 61, 169 R
See application file for complete search history.

(56) References Cited

U.S. PATENT DOCUMENTS

| 2,493,989 | A | * | 1/1950 | Middlestetter | 185/37 |
| 3,625,502 | A | * | 12/1971 | Joerres | 267/167 |
| 4,653,982 | A | | 3/1987 | Kojima et al. | |
| 4,702,005 | A | * | 10/1987 | Pittinger et al. | 30/276 |
| 5,733,231 | A | * | 3/1998 | Corn et al. | 482/120 |
| 6,428,274 | B1 | * | 8/2002 | Hehenberger | 416/153 |
| 6,575,276 | B2 | * | 6/2003 | Fukunaga et al. | 192/3.29 |
| 6,609,889 | B1 | | 8/2003 | Vilsboll | |
| 6,825,574 | B1 | * | 11/2004 | Mooring | 290/1 R |
| 6,845,736 | B1 | * | 1/2005 | Anderson | 119/796 |

FOREIGN PATENT DOCUMENTS

| DE | 197 20 025 A1 | 10/1997 |
| EP | 1 389 686 A | 2/2004 |
| WO | WO 03/080414 A | 10/2003 |
| WO | WO 03/091570 A | 11/2003 |

* cited by examiner

*Primary Examiner* — Edward Look
*Assistant Examiner* — Ryan H Ellis
(74) *Attorney, Agent, or Firm* — Global Patent Operation; Douglas D. Zhang

(57) ABSTRACT

A mechanical emergency brake for a wind turbine is provided, said mechanical emergency brake comprising a spiral spring with a loop at its outer end, a cassette for accommodating said spring and a casing for receiving said cassette and said spring, wherein said casing comprises a retention pin to which the loop of the spring can be fixed.

23 Claims, 4 Drawing Sheets

MECHANICAL EMERGENCY BRAKE FOR WIND TURBINES AND METHOD FOR OPERATING SAME

FIELD OF THE INVENTION

The invention relates to a mechanical emergency brake for wind turbines, in particular to a spiral spring for such an emergency break, a cassette for said spiral spring and a casing for said spring and cassette, to a wind turbine equipped with a mechanical emergency break system and to a method of operating the mechanical emergency break.

BACKGROUND OF THE INVENTION

Typically, modern wind turbines have rotor blades with adjustable pitch angle. The rotor blades can be rotated about their longitudinal axis by means of a pitch drive disposed in the rotor hub. Typically, the pitch drive is actuated electrically or hydraulically. By adjusting the pitch angles of the rotor blades, the power generation of the wind turbine can be controlled as well as an aerodynamical braking of the rotor can be accomplished. Particularly, the rotor blades generate a braking torque when moved into feather position. Thereby, the rotor blades ensure that the rotor is not further accelerated and, thus, the rotor blades form an aerodynamical brake for the wind turbine.

The aerodynamical brake effect of the rotor blades is also used for braking the rotor in case of emergency, e.g. when a failure of the drive system occurs or when the wind turbine is in an uncontrolled condition. Accordingly, it is very important that the emergency system works absolutely reliable even when the wind turbine is damaged or in an uncontrolled state, e.g. due to lightning. Especially, the pitch drive is required to function even in a power outage condition.

As a solution to this problem, uninterruptible power supplies (UPS) for the pitch drive have been proposed, e.g. in chapter 8.4.6 of "*Windturbines*" by E. Hau, Springer-Verlag, 2000, pages 236 and 237. However, such an approach may fail when the electronics of the wind turbine is damaged, e.g., by lightning.

Therefore, a redundant mechanical fallback system has been proposed in DE 197 20 025. Therein, the pitch drive is actuated by energy stored in springs which are coupled to the drive shaft of the pitch drive via a gear. According to DE 197 20 025, several springs are accommodated in a casing with separator disks in between. The springs are fixed to the casing to a center shaft extending through the casing with hooks, respectively. However, the arrangement according to DE 197 20 025 does not ensure smooth operation of the springs: the separator disks moved vertically along the center shaft and, thus, laterally pinched the springs. It was also observed that the hook fixed to the casing broke during operation. The hook was fixedly attached to the casing and, therefore, immense mechanical stress was applied to the hook during winding up the spring. Finally, the operational safety of the arrangement according to DE 197 20 025 is insufficient: In the event that a tightening strap of a spring broke, the spring exploded and could hurt somebody. Also, the spring was unusable afterwards. Furthermore, the monitoring of the spring condition is accomplished by measuring the diameter of the spring coil. However, this requires complicated sensor equipment which is error-prone.

SUMMARY OF THE INVENTION

It is therefore an object of the present invention to provide an improved mechanical emergency brake for a wind turbine.

Further aspects, advantages and details of the present invention are apparent from the dependent claims, the description and accompanying drawings.

According to a first aspect of the present invention, a spiral spring for a mechanical emergency brake of a wind turbine is provided, wherein said spiral spring comprises a fixing means for fixing said spiral spring to a retention means, wherein said fixing means is adapted to rotate about said retention means when being fixed to it. Thereby, the fixing means can make an evasive movement during the wind-up of the spring coil. Thus, the mechanical stress imposed to the fixing means can be considerably reduced and breaking of the fixing means can be avoided.

According to another aspect of the present invention, a cassette for receiving a spring is provided, wherein said cassette comprises an upper cap, a lower cap, and spacers disposed between said upper and lower caps, wherein said upper and lower caps have a through hole for receiving an axle. The spring cassette ensures a smooth operation of the spring which can freely unwind within the space defined by the cassette. Furthermore, the spring can be fully encapsulated by within the cassette so that safe transport and handling of the spring is ensured. Thus, even in the event that the tightening strap breaks and the spring explodes, a person handling the spring is safe.

According to still a further aspect of the present invention, a housing for a spring energy storage used in a mechanical emergency brake for a wind turbine is provided. The housing comprises a base wall, a side wall and a top wall, wherein the housing is designed to receive at least one unit comprised of a spiral spring accommodated in a cassette. Furthermore, the housing further comprises a means for locating an outer end of the spiral spring in location. This means can be engaged with a locking means disposed at the spring so that the spring is fixed but can rotate about the locking means. Thus, the mechanical stress applied to the locking means during winding up the spring is considerably reduced. As a result, the probability of breakage of the locking means is reduced.

According to even a further aspect of the present invention, a spring energy storage for a mechanical emergency brake for a wind turbine is provided. The spring energy storage comprises a housing in which a spring unit is accommodated. The spring unit is formed of a spiral spring accommodated in a spring cassette. Such a spring energy storage provides a mechanical fallback system which can operate without any power supply.

According to still another aspect of the present invention, a wind turbine is provided that comprises a rotor with at least one rotor blade, a pitch drive for rotating said at least one rotor blade about a longitudinal axis, and a mechanical emergency brake. The mechanical emergency brake comprises a spring energy storage which is coupled to a drive shaft of said pitch drive. Thus, the pitch drive of the wind turbine can be actuated even in cases where no electrical power supply is available. Accordingly, the rotor blades of the wind turbine can be pitched to a feather position and, thus, the rotor can be braked.

According to a different aspect of the present invention, a method for operating a mechanical emergency brake for a wind turbine is provided, said method comprising the steps of measuring a variable indicative of a holding torque of an electric motor of the pitch drive, comparing the measured value of the variable with a desired value of the variable, and braking said wind turbine if the comparison of said actual with said desired value reveals that the wind turbine is in a faulty condition.

BRIEF DESCRIPTION OF DRAWINGS

A full and enabling disclosure of the present invention, including the best mode thereof, to one of ordinary skill in the art, is set forth more particularly in the remainder of the specification, including reference to the accompanying figures wherein:

FIG. 2b shows a top view of a top cover/bottom wall for the casing shown in FIG. 2a.

DETAILED DESCRIPTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
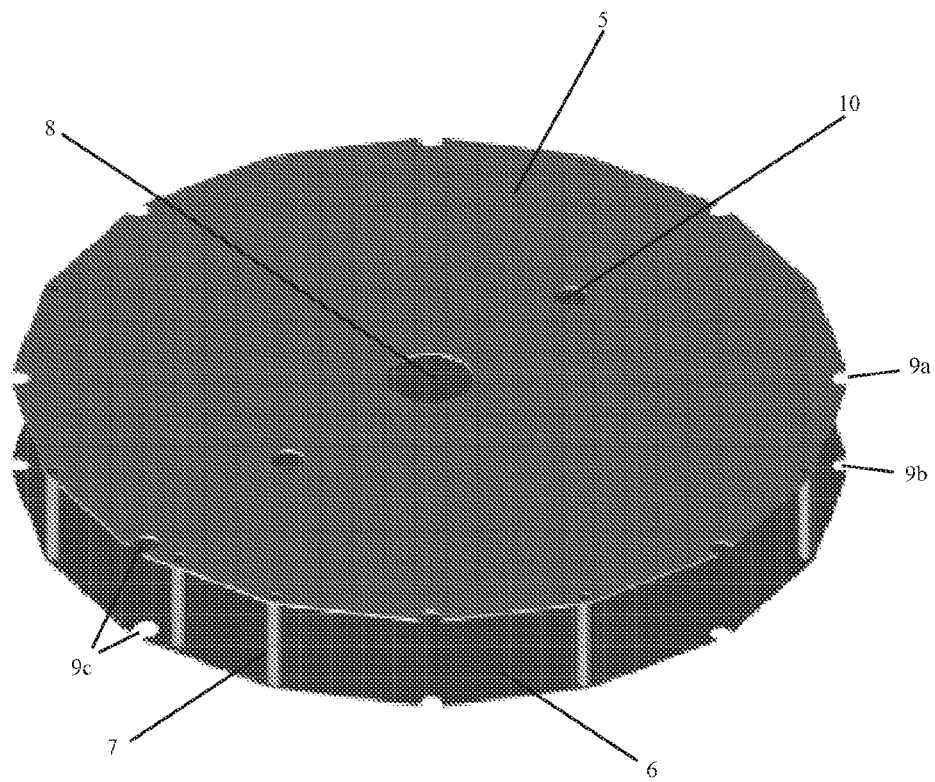
FIG. 1 shows a perspective view of a cassette according to an embodiment of the present invention.

FIG. 1 shows a spring cassette according to an embodiment of the present invention. The cassette comprises an upper part 5 and a lower part 6 which are spaced by separators 7. The upper and lower parts 5, 6 are formed of metal plates of 1.5 mm thickness. Typically, the thickness of the metal plates for the upper and lower parts 5, 6 of the cassette is in the range of 1 mm to 3 mm. The upper and lower parts 5, 6 have a central bore 8 in which a drive shaft 16 can be inserted. Furthermore, the upper and lower parts comprise through holes 10. Through these holes 10, oil can enter the space between the upper part 5 and the lower part 6 or can be discharged from that space. Thus, fluid communication of the inner space of the cassette with an oilbath is provided. Furthermore, grooves 9a, 9b are provided at the periphery of upper and lower parts 5, 6. The grooves 9a of the upper part 5 and the grooves 9b of the lower part 6 are aligned with each other so that guide pins 14 can be inserted into the grooves 9a, 9b. Accordingly, grooves 9a, 9b serve as guide means. Alternatively, the guide means can be realized by aligned through holes in the upper and lower parts 5, 6 in which the guide pins can be inserted. Also, a combination of grooves and through holes may be provided. One pair of grooves 9c is larger than the others so that it can receive a retention means like, e.g., an outer retention pin to which an outer end of the spiral spring is fixed.

The separators 7 are formed as cylindrical rods and have typically a diameter of 12 mm and a length of 62 mm. However, the length of the separators 7 is determined by the width of a spring 1 to be accommodated in the cassette. In the present embodiment, the spring 1 has a width of 60 mm so that additional space of 1 mm above and below the spring is ensured by the separators of 62 mm length. However, the additional space may be varied from, e.g. 0.5 mm to 4 mm, as long as a smooth operation of the spiral spring accommodated in the cassette is ensured. Typically, the separators 7 are threaded at their upper and lower ends to be fixed to the upper and lower parts 5, 6. Especially, the separators may extend through upper and lower parts 5, 6 and be fixed by nuts. In this case, the length of the separators is larger than described before so that the inner width of the cassette is maintained. Alternatively, the separators 7 may also be welded to upper and lower parts 5, 6.

In the present embodiment, the cassette has a height of 65 mm (1.5 mm lower part/62 mm separators/1.5 mm upper part). The diameter of the cassette is determined by the diameter of the spiral spring which is 500 mm in the present embodiment.

Figure 2A:
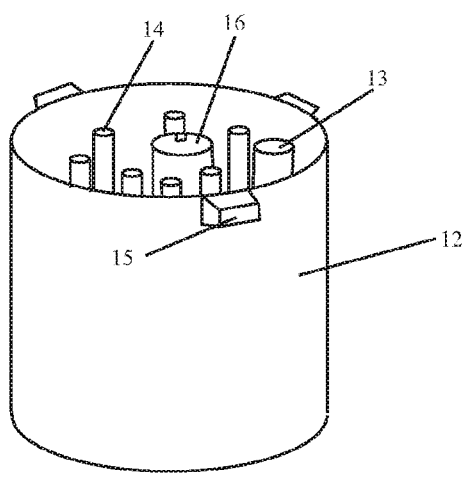
FIG. 2a shows a perspective view of a casing according to an embodiment of the present invention.
Figure 2B:
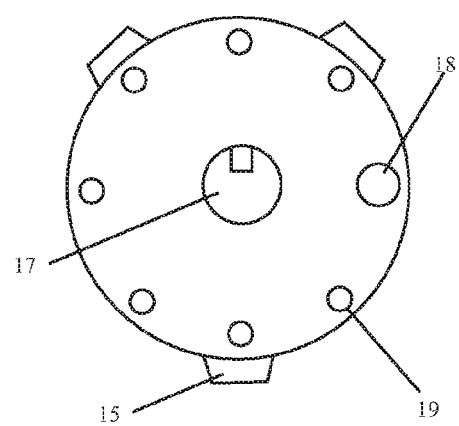

FIG. 2a shows a casing 12 according to an embodiment of the present invention. The casing is designed to accommodate one ore more of the above-described cassettes. The casing 12 comprises a bottom wall, a side wall and a top cover (FIG. 2b). Although the side wall has a circular cross-section in the present embodiment, it can also have any other suitable shape, especially it can be polygonal. Typically, flanges 15 are provided at the rim of the casing 12. The flanges 15 comprise additional guiding means (not shown) facilitating the assembly of the top cover. Furthermore, screw bolts extending through the top cover can press against the flanges 15 and can, thus, facilitate disassembling the top cover. This is especially useful when the springs are immersed in an oilbath.

In the inner space of the casing, a drive shaft 16 with a groove is provided. The drive shaft is formed with a toothing so that it can be mounted to a gear shaft via a sliding collar (not shown). Furthermore, a retention pin 13 is provided, wherein a loop 2 at an outer end of a spring 1 can be fixed to said retention pin 14. The retention pin 13 can be inserted into the larger pair of grooves 9c. Furthermore, guide pins 14 are provided inside the casing, said guide pins 14 being insertable into guide means of the cassettes. In the present embodiment, the guide pins 14 can be inserted into grooves 9a, 9b. The retention pin 13 and the guide pins 14 are fixed to the bottom wall of the casing 12 either by welding or may be formed as threaded bars. In the latter possibility, the pins 13, 14 may extend through the bottom wall may then be fixed by nuts or may be engaged with female threads provided in the bottom wall. Alternatively, male threads may be provided on the bottom wall of the casing 12 and the pins 13, 14 may have female threads. Typically, retention pin 13 and guide pins 14 are formed as cylindrical rods, wherein the diameter of the retention pin 13 is larger than the diameter of the guide pins 14. Typically, retention pin 13 has a diameter of 16 mm and guide pins 14 have a diameter of 12 mm.

A top cover of the casing is shown in FIG. 2b. The drive shaft 16, retention pin 13 and guide pins 14 may extend through holes 17, 18, 19 in the top cover. Retention pin 13 and guide pins 14 are then fixed by nuts. However, retention pin 13 and guide pins 14 may also have female threads at their upper ends so that they can be fixed by screws inserted through holes 18, 19 in the top cover. Furthermore, flanges 15 are provided at the periphery of the top cover. The flanges 15 of the top cover can be aligned with the flanges 15 of the casing 12 by guiding means (not shown). Also, screw bolts can be inserted into flanges 15 of the top cover so that they can press against the flanges 15 of the casing 12, thus, facilitating the disassembly of the top cover.

Figure 3:
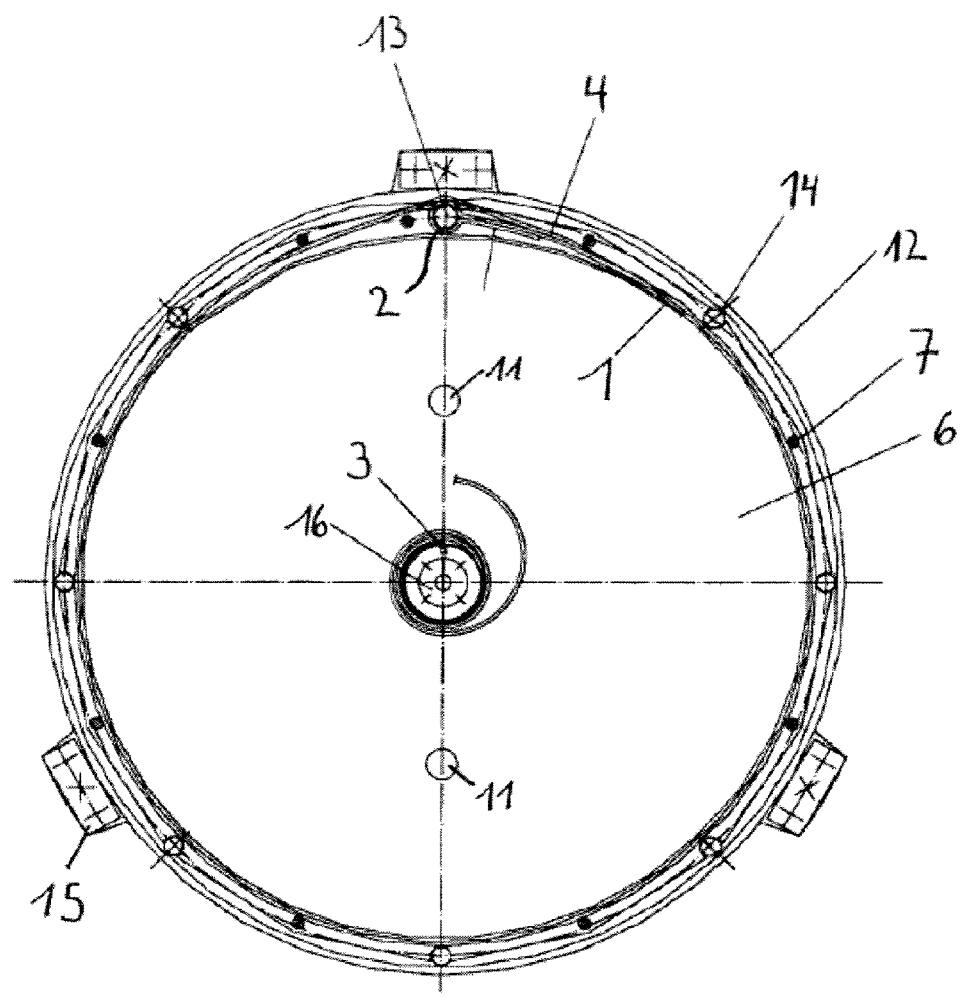
FIG. 3 shows a cross sectional view of an assembled spring energy storage according to an embodiment of the present invention.
Figure 3A:
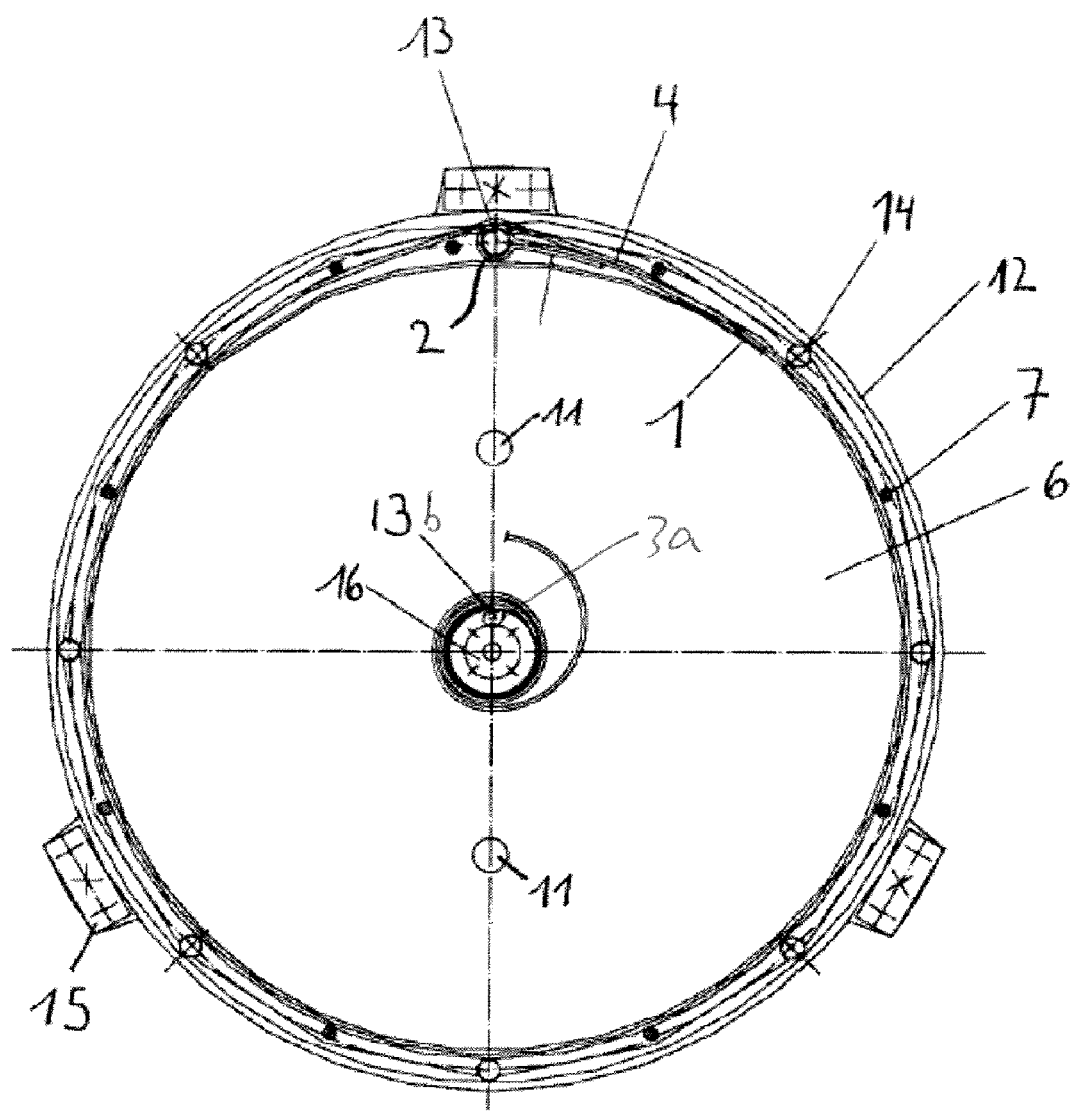

Next, a spiral spring according to an embodiment of the invention is described with reference to FIG. 3. Therein, a spiral spring is shown which comprises a loop 2 at its outer end. The loop 2 is adapted so that a retention means, e.g. an outer retention pin 13, can be inserted into said loop. At the inner end of spiral spring 1, a hook 3 is provided which is insertable into a slit provided on a drive shaft 16. Alternatively, the hook 3 can be replaced by a further loop 3a (FIG. 3A). In this case, an inner retention pin 13b must be provided on the drive shaft 16 so that the inner loop 3a can be disposed over the inner retention pin 13b. Prior to assembly, the spring is kept in a released state and is held by a tightening strap 4.

In the present embodiment, the spiral spring is made of texturized rolled spring steel and has a length of about 22,000 mm, a width of about 60 mm and thickness of about 1.8 mm. Typically, the spring has a thickness in the range of 1.25 mm to 2.25 mm, a width in the range of 40 mm to 80 mm, and a length in the range of 15 m to 30 m. The spring 1 of the present embodiment can be wound up by 29 rotations. When being wound up to 23.5 rotations, it is prestressed by about 70 Nm. Typically, a spiral spring 1 has a prestress in the range of 50 Nm to 100 Nm, when being wound up in a range of 70% to 90% of the total number of rotations.

Next, the assembly of a spring cassette used in a spring energy storage according to the present invention is described. First, separators 7 are fixed to the lower part 6 in that the separators 7 are screwed on male threads provided on the lower part 6. Alternatively, the separators can be fixed by screws inserted from below through holes in the lower part 6. Next, a spiral spring 1 with a loop 2 at its outer end is disposed on lower part 6 so that the loop 2 is located over the large groove 9c of the lower part 6. Then, the upper part 5 is fixed to the separators either by screws inserted through holes in the upper part 5 or by welding. Thus, a spring cassette is formed that provides a defined space for the spiral spring 1 and, thus, allows for smooth operation of the spring 1. Especially, spring 1 can freely wind up and unwind during operation and will not interfere with other springs provided in a spring energy storage. Also, this arrangement increases operational safety considerably because the spiral is encapsulated by the cassette. Therefore, the spiral 1 will be locked in the inner space defined by the cassette even when the tightening strap 4 breaks.

Now, the assembly of a spring energy storage according to an embodiment of the present invention is described with reference to FIG. 3. To this end, a spring cassette is disposed in a casing 12, wherein the spring cassette is aligned with the retention pin 13 and the guide pins 14. Also, the loop 2 of the spiral spring 1 is disposed over retention pin 13 and the hook 3 is inserted into the groove of the drive shaft 16. In the present embodiment, six spring cassettes of the above described type are placed in the casing 12. Then, oil is filled in the casing 12 so as to provide an oil bath for lubrication of the springs. The oil enters the inner space of the cassettes through holes 10 and 11 provided in the upper and lower parts 5, 6 of the cassettes. The casing 12 is sealed and, therefore, oilproof. Finally, the top cover is fixed to the casing 12 and the retention pin 13 is fixed by a screw bolt inserted through hole 18 and the guide pins 14 are fixed by screw bolts inserted through holes 19. Also, screw bolts are inserted into flanges 15. As mentioned above, the springs 1 are assembled in a released state.

Next, the assembled spring energy storage is mounted to a gear shaft (not shown). To this end, drive shaft 16 is formed with a toothing and the gear shaft is formed as a hollow shaft. Drive shaft 16 and the gear shaft are then coupled via a sliding collar (not shown). After the spring storage has been mounted to the pitch gear, the springs are manually prestressed by 2 to 5 rotations. To this end, a prestressing means (not shown) is provided on the outside of casing 12. Typicall, the prestressing is done manually. Thus, the inner end of the spring 1 is fixed to drive shaft 16 and the spring energy storage can actuate the pitch drive of the wind turbine via a pitch gear by means of the mechanical energy stored in the spring 1.

Figure 4:
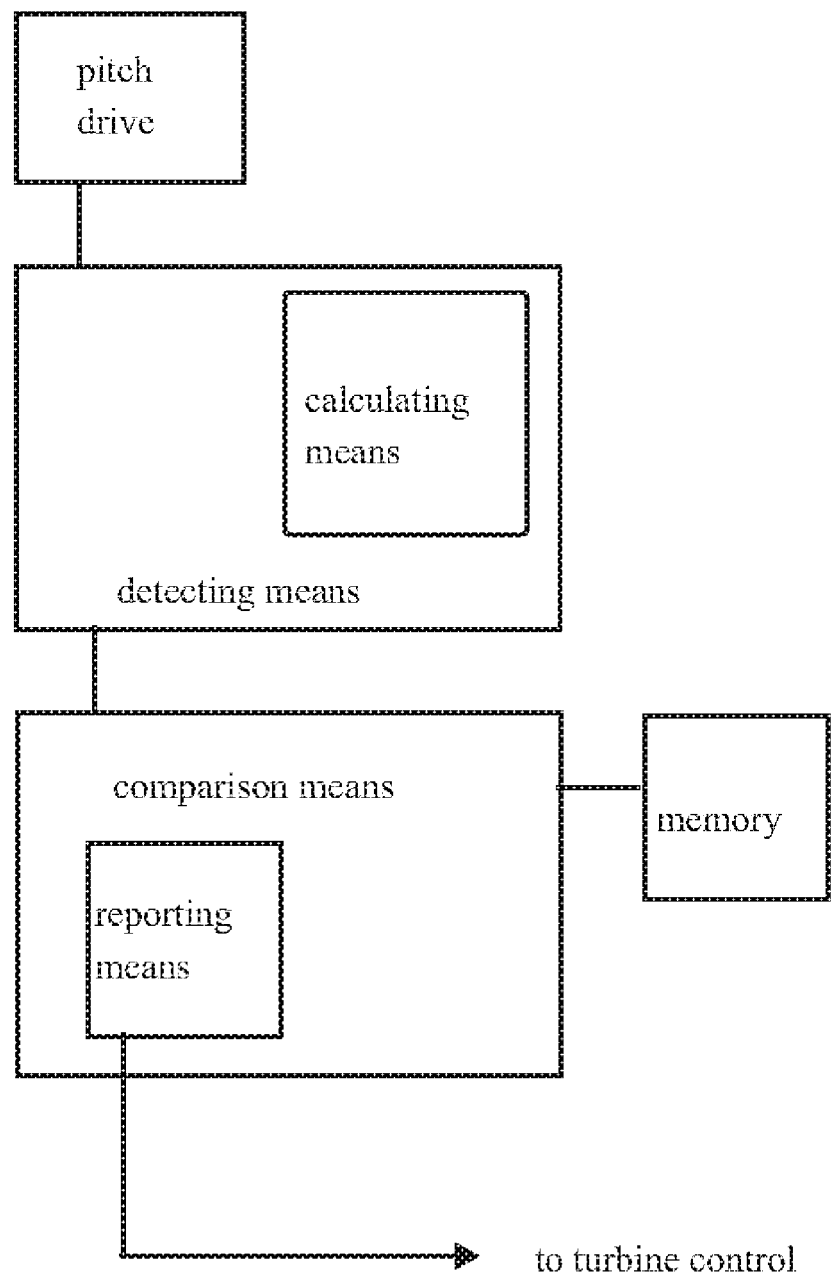
FIG. 4 shows a diagram of a mechanical emergency brake system according to an embodiment of the present invention.

Now, a mechanical emergency brake system according to an embodiment of the present invention is described with reference to FIG. 4. Therein, the pitch drive of a wind turbine is shown. The pitch drive comprises a motor for rotating a rotor blade of the wind turbine, and a spring energy storage of the above described type. During operation, the pitch motor and the spring energy storage are coupled via a pitch gear (not shown).

The pitch drive is connected with a detection means that can measure a variable indicative of a holding torque of a pitch drive motor. Typically, the pitch drive motor is a dc series-characteristic motor and, then, the variable motor torque, or the pitch drive motor is a three-phase asynchronous motor and, then, the variable is the active current component of the energizing current. The detecting means further comprises calculating means which are adapted to calculate the moving average of said variable indicative of the holding torque. Typically, the moving average is calculated over at least two complete rotations of the rotor.

The mechanical emergency brake system comprises further comparison means which are adapted to compare the measured value of the variable with a desired value of said variable. The desired value can be determined during the set-up operation of the wind turbine or can be obtained from another spring energy storage located at another rotor blade of the wind turbine. Also, both methods of obtaining the desired value can be combined. The desired values can be stored in a memory. This memory can also be shared with the calculating means for the calculation of the moving mean. Furthermore, the mechanical emergency brake system comprises a reporting means which is adapted to report a faulty condition to the wind turbine control.

On start up of the wind turbine, i.e. before the wind turbine is connected to the grid, the spiral spring 1 is wound up by 18.5 rotations, i.e. from 5 to 23.5 rotations. Mechanical stress is applied to the parts of the spring which are fixed, i.e. to hook 3 and the loop 2, since the spring 1 attempts to make evasive movements. Since the outer end of the spring 1 is allowed to rotate about retention pin 13, the mechanical stress is considerably reduced compared with prior art arrangements where the outer end of the spring was fixed to the casing with a hook. Thus, the risk of breakage at the outer end of the spring is reduced and a longer lifetime of the spring is ensured. Consequently, also maintenance intervals for the spring energy storage are considerably extended. When the spring is wound up or unwound, the outer retention pin 13 absorbs the torque applied by the spring. Particularly, the springs 1 apply a bending moment to retention pin 13 which is transmitted to the cassette and absorbed by guide pins 14. Furthermore, the tightening strap 4 sits closely against the separators 7, especially one separator can be located between the tightening strap 4 and the spiral spring 1. Thus, torque is transmitted from the spring to the cassette and absorbed by guide pins 14. Thus, not only retention pin 13 but also guide pins 14 absorb torque and bending moments.

During start up of the wind turbine, the detection means detects the number of motor rotations after the motor brake is released. If the actual number of motor rotations is lower than the desired number of rotations, e.g. 1 to 5 in the present embodiment, the reporting means generates an error signal and sends it to the wind turbine control. The wind turbine control will then terminate the start-up process and shut down the wind turbine by means of the electrical drive. The error signal will permanently send to the wind turbine control so that the wind turbine remains in a shut-down condition.

During normal operation, i.e. after the wind turbine has been successfully started and connected to the grid, the rotor blade is moved from feather position (90°) to working position (0°). During this movement, the springs contained in the spring energy storage are wound up to 23.5 rotations, i.e. to 81% of their maximum number of rotations. In working position of the rotor blade, the prestress of each individual spring is 70 Nm. In the present embodiment, six spiral springs are coupled the drive shaft in parallel, resulting in a total torque of about 420 Nm. The gear reduction of the pitch gear is ¹⁄₄₀ in the present embodiment. Accordingly, the pitch drive motor has to provide a holding torque of about 10.5 Nm in the working position of the rotor blade. When the rotor blades are moved to working position, the pitch drive rotor has to wind up the spiral spring by 18.5 additional spring rotations, i.e. about 740 motor rotations. During normal operation, the rotor blade is pitched in a range of 0° to 22.5° corresponding to 0 to 4 spring rotations or 0 to 160 motor rotations in the present embodiment.

During normal operation, the detection means measures the fraction of the current generating motor torque. For a dc series-characteristic motor, the motor torque is proportional to the motor current. For a three-phase asynchronous motor, the active current component of the energizing current is proportional to motor torque. However, also the temperature dependency of the rotor resistance resulting in a variation of slip has to be taken into account in the latter case. A moving average of the measured variable is then calculated over at least two complete rotations of the rotor. The values measured during this time slot are stored in a memory. The moving average is then compared to a desired value. This desired value can either be obtained from start-up values stored during start-up of the wind turbine or from measured values of other, preferably identical, spring energy storages disposed at other rotor blades of the wind turbine. Also, a combination of both methods is possible. If a loss of torque in the spring energy storage is detected by the comparison of the actual with the desired values, a error signal is reported to the wind turbine control. The wind turbine control will then brake the wind turbine in a controlled manner and bring it into a safe condition. Automatic restart of the wind turbine is prevented by a permanent error signal of the mechanical emergency brake system to the wind turbine control.

In a case where a loss of torque in the energy spring storage is detected, maintenance staff has to check the faulty spring energy storage and to replace the damaged spring cassette.

Finally, the operation of the mechanical emergency brake system is described when the electric or hydraulic drive of the pitch system is out of order. In such a case, the pitch drive motor will not maintain the holding torque balancing the torque of the spring energy storage. Since the torque of the spring energy storage is sufficient to rotate the rotor blade, the rotor blades will be pitched into feather position. A block (not shown) is provided at the feather position so that the rotor blade cannot be rotated onward. However, a damper is provided between the rotor blade and the block so that the longitudinal speed of the rotor blade is smoothly reduced before the blade engages with the block. Typically, the damper is a hydraulic element, a spring element or an elastomeric damping element. Thus, the rotor is braked and the wind turbine is brought into a safe condition.

Having thus described the invention in detail, it should be apparent that various modifications can be made in the present invention without departing from the spirit and scope of the following claims.

The invention claimed is:

1. A cassette for receiving a spiral spring for a wind turbine, the spiral spring comprising a first connector configured to connect an outer end of the spiral spring to a retention pin, the first connector being rotatable about the retention pin when being coupled to the retention pin, the spiral spring further comprising a second connector configured to connect an inner end of the spiral spring to a drive shaft of the wind turbine, said cassette comprising:
an upper part,
a lower part, and
separators disposed between said upper and lower parts, wherein each of said upper and lower parts has a central bore for receiving the drive shaft of the wind turbine, and wherein each of said upper and lower parts further has a hole at a periphery thereof and configured to receive the retention pin.

2. The cassette according to claim 1, wherein said separators are distributed along the periphery of said upper and lower parts.

3. The cassette according to claim 1, wherein the length of said separators is about 1 mm to 3 mm larger than the width of said spiral spring.

4. The cassette according to claim 1, further comprising guide means provided at the upper and lower parts of the cassette, wherein said guide means are aligned with each other so that they can receive a guide pin.

5. The cassette according to claim 4, wherein said guide means are grooves provided at the periphery of the upper and lower parts of the cassette.

6. The cassette according to claim 4, wherein said guide means are through holes provided in the upper and lower parts of the cassette.

7. A spring unit for a mechanical emergency brake of a wind turbine, comprising a spiral spring comprising a first connector connecting an outer end of the spiral spring to a retention pin, the first connector being rotatable about the retention pin when being coupled to the retention pin, the spiral spring further comprising a second connector connecting an inner end of the spiral spring to a drive shaft of the wind turbine, and
a cassette for accommodating the spiral spring, the cassette comprising an upper part, a lower part, and separators disposed between said upper and lower parts, wherein said upper and lower parts have a central bore for receiving the drive shaft, and wherein said upper and lower parts further comprise a locking means configured to receive the retention pin.

8. A casing for a spring energy storage used in a mechanical emergency brake for a wind turbine, comprising:
a lower wall;
a side wall;
a drive shaft to which an inner fixing means of a spiral spring can be fixed;
a retention means to which an outer fixing means of the spiral spring can be fixed; and
a top cover;
wherein said casing is configured to receive a spring unit comprising a cassette and the spiral spring which is accommodated in the cassette, the cassette comprising:
an upper part having a first central bore for receiving the drive shaft;
a lower part having a second central bore for receiving the drive shaft separators disposed between the upper part and the lower part; and
a locking means configured to receive the retention means,
the outer fixing means of the spiral spring being configured to be rotatable about the retention means when being affixed thereto.

9. The casing according to claim 8, wherein said retention means is an outer retention pin fixable to said lower wall and to said top cover.

10. The casing according to claim 8, further comprising at least one guide pin insertable into a guide means of the spring unit.

11. The casing according to claim 8, wherein said casing is oilproof.

12. A spring energy storage device for a mechanical emergency brake for a wind turbine, comprising the casing according to claim 8 and the spring unit.

13. The spring energy storage device according to claim 12, wherein 4 to 8 spring units are accommodated in said casing.

14. The spring energy storage device according to claim 12, further comprising an oilbath for lubricating said spring unit.

15. A wind turbine comprising a rotor with at least one rotor blade, a pitch drive for rotating said at least one rotor blade about a longitudinal axis, and a mechanical emergency brake, wherein said mechanical emergency brake comprises the spring energy storage device according to claim 12, the drive shaft is a drive shaft of the pitch drive, and said spring energy storage is coupled to the drive shaft of said pitch drive.

16. The wind turbine according to claim 15, further comprising a block against which said rotor blade seats in a feather position.

17. The wind turbine according to claim 16, further comprising a damping element for reducing a longitudinal rotational speed of said rotor blade before seating against said block.

18. The wind turbine according to claim 15, further comprising a detecting means for detecting a variable indicative of a holding torque of an electric motor comprised in said pitch drive.

19. The wind turbine according to claim 18, wherein said electric motor is a dc series-characteristic motor and said variable indicative of said holding torque is the motor torque.

20. The wind turbine according to claim 18, wherein said electric motor is a three-phase asynchronous motor and said variable indicative of said holding torque is the active current component.

21. The wind turbine according to claim 18, wherein said detecting means comprises a calculating means to calculate the moving average of said variable indicative of said holding torque.

22. The wind turbine according to claim 18, further comprising a memory for storing desired values of said variable indicative of said holding torque, and a comparison means for comparing an actual value of said variable indicative of said holding torque with said desired value of said variable.

23. The wind turbine according to claim 22, further comprising a reporting means for reporting a faulty condition of said spring energy storage to a wind turbine control, wherein said faulty condition is detectable by said comparison means if said actual value of said variable is lower than said desired value of said variable by a predetermined amount, and wherein said wind turbine control is adapted to shut-down said wind turbine on report of a faulty condition by said reporting means.

* * * * *